3,459,820
METHODS OF OBTAINING CHLORINATED
ORGANIC COMPOUNDS
Jean Charles Eugène Bolle, Vert-le-Petit, France, assignor to Institut National de Recherche Chimique Appliquee, Paris, France, and Institut du Genie Chimique de Toulouse, Empalot, Haute-Garonne, France
No Drawing. Filed Oct. 11, 1966, Ser. No. 585,724
Claims priority, application France, Oct. 18, 1965, 35,315
Int. Cl. C07c *17/02, 19/02*
U.S. Cl. 260—660          5 Claims

ABSTRACT OF THE DISCLOSURE

The chlorination of ethylene by addition to produce dichloroethane selectively is carried out in a liquid solvent medium of dichloroethane using a mixture of gaseous chlorine and gaseous sulphurous anhydride as the chlorination agent.

---

It is known to produce chlorinated organic compounds by the action of chlorine or olefinic compounds, by addition reactions, or on alkanes or aromatic molecules, by substitution reactions.

Addition reactions of chlorine on olefinic compounds may take place spontaneously in a predetermined temperature range to keep the substitution by-reaction within certain limits; however, it is admitted that they are induced by wall effects or the intervention of polar impurities such as water or hydrochloric acid. More generally, these additions are catalyzed either in the gaseous phase by means of substances such as activated carbon, bauxite, pumice, silica gel, etc., impregnated or not with metal chlorides such as magnesium chloride, aluminium chloride, zinc chloride, copper chloride, nickel chloride, cobalt chloride, chromium chloride, antimony chloride and molybdenum chloride, or in the liquid phase, by introducing iodine, trichloride of antimony, ferric chloride or other metal halides into the solvent medium (dichloroethane, tetrachloroethane or the like) as taught for example by Houben-Weyl, Methoden der Organischen Chemie, Band V/3, p. 530–531). It was observed more particularly that the addition of 0.5% of sulphurous gas or sulphuryl chloride or sulphur chloride (U.S. Patent No. 1,362,355) regularized the addition reaction of chlorine on ethylene in gaseous phase by limiting the substitution by-reactions; the addition of small amounts of ferric chloride was claimed as acting likewise in the preparation of dichloroethane in the liquid phase.

It is also worth pointing out that the addition reaction of chlorine on olefins is a particularly exothermic reaction which is therefore attended by certain difficulties, notably in the preparation of dichloroethane, such as the necessity of diluting the medium with a large excess of ethylene, nitrogen or even carbon dioxide gas, in the case of gaseous phase reactions (Houben-Weyl, Methoden der Organischen Chemie, Band V/3, p. 531, 568, 587); and the necessity of delivering the gases separately into the solvent media, in the case of liquid phase reactions, with a greater difficulty of obtaining a homogeneous mixture. In fact, if ethylene and chlorine are mixed at room temperature without taking special cares sudden ignitions are observed.

Substitution reactions of chlorine on alkanes or aromatic molecules are carried out preferably in the gaseous phase in the case of low molecular weight alkanes and mostly in the liquid phase in the case of aromatic hydrocarbons. They are facilitated as before by the presence of catalysts and more particularly the chlorination of aromatic hydrocarbons takes place in the liquid phase by using ferric chloride, aluminium chloride, tri- and pentachloride of antimony, molybdenum chloride, stannic chloride, etc., as catalysts. In the liquid phase, the substitutions of chlorine on an aromatic nucleus are also faciliated by the use of a strongly polar solvent such as acetic acid, sulphuric acid, chlorosulphonic acid (Houben-Weyl, Methoden der Organischen Chemie, Band V/3, p. 652).

According to the present invention it was found that chlorination reactions can be carried out successfully in the liquid phase either by addition on unsaturated linkages or by substitution of chlorine atoms for hydrogen atoms by utilizing a mixture of chlorine and sulphurous anhydride containing a substantial amount of this last-named component which is considerably greater than a simple catalytic addition, that is, a mixture comprising for example and preferably approximately equal volumes of gaseous chlorine and gaseous sulphurous anhydride, it being understood that this specific proportion is given by way of illustration only and that therefore it must not be considered as limiting the scope of the present invention, as the volume ratio of the two gaseous component elements of the mixture may actually vary from 1:10 to 10:1.

The volumetric proportion of nearly 1:1 of the gaseous chlorine and gaseous sulphurous anhydride mixture considered as the most desirable results from a specific feature of this invention which consists in ultilizing preferably, for chlorination reactions in liquid phase of the aforesaid types, the chlorine and sulphurous anhydride mixture resulting from the either catalyzed or noncatalyzed heat decomposition of chlorosulphonic acid according to the reaction:

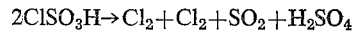

$$2ClSO_3H \rightarrow Cl_2 + Cl_2 + SO_2 + H_2SO_4$$

or from the similar heat decomposition of the metal chlorosulphonates (notably of alkaline and alkaline-earth metals) such as for example the sodium chlorosulphonate resulting from the action of sulphuric anhydride $SO_3$ or chlorosulphonic acid on sodium chloride NaCl. Of course, these examples should not be construed as limiting the number of chlorinated substances derived from the action of sulphuric anhydride $SO_3$ on hydrochloric acid HCl or its salts and capable of yielding by decomposition a chlorine and sulphurous anhydride mixture suitable for carrying out the method of this invention.

A first advantageous feature of this invention lies in the fact that sulphurous anhydride acts as an inert gaseous diluent with respect to chlorine and therefore reduces considerably the risks of very quick reactions. Thus, for example, ethylene may be mixed with the gaseous chlorine and sulphurous anhydride mixture preliminary to the introduction into a liquid phase without exerting any particular cares and without any risk of ignition; thus, a satisfactory reaction homogeneity is achieved without resorting to any particular devices or means.

Another advantage characterizing this invention lies in the great solubility of sulphurous gas in organic solvents. In fact, it was observed that sulphurous gas was highly soluble in dichloroethane, even at 40 to 50° C. On the other hand, benzene will dissolve 127.5 grams of sulphurous anhydride per litre at 30° C. and 34 grams at 60° C. (cf. Paul Pascal, Nouveau Traité de Chumie), Tome XIII, p. 1225). Thus, during the reaction and owing to the high dielectric constant of sulphurous gas, highly polar media are rapidly formed which promote the desired reactions. This advantage is particularly apparent from the observed fact that it is thus possible to add chlorine to ethylene by utilizing nearly stoichiometric proportions of the reagents and that in any case the ethylene and chlorine implemented can be consumed integrally in the reaction.

A third advantage characterizing this invention is that the gases issuing from the liquid reaction medium can easily be disposed of due to the facility with which sulphurous gas can be liquefied by applying conventional methods permitting its purification by rectification. Moreover, it was observed that after the organic components have been separated a possible mixture of sulphurous gas and hydrochloric acid issuing from a substitution chlorination reaction, such as benzene chlorination, can be treated with a solution of sulphuric anhydride in sulphurous anhydride for reforming chlorosulphonic acid.

A fourth particularly remarkable advantage of this invention is due to the use of the chlorosulphonic acid intermediate. This intermediate, otherwise of great value, is an easily transportable liquid whereby it can be transferred from the place where hydrochloric acid is prepared to the chlorination plant disposed at another place, without any major difficulty. Thus, beneficial recoveries of hydrochloric acid constituting an impairment in various factories may be made by restoring its initial value by way of potential chemical chlorine in the form of chlorosulphonic acid and thus avoiding local risks of pollution by salting due to neutralized effluents.

On the other hand it was observed that sulphurous anhydride does not produce by-reactions in the preparation of chlorinated derivatives. In fact, it is known (cf. for example Paul Pascal, Nouveau traité de Chimie, Tome XIII, p. 1235), that sulphurous anhydride can react with olefins to yield polymers of the polysulphone type. Although these poly-condensations can take place at low temperatures they require nevertheless the presence of an activator such as azoisobutyronitrile. In fact, in an addition reaction of chlorine with ethylene by using the mixture consisting of equal volumes of gaseous chlorine and sulphurous gas, no traces of sulphur-containing residue have been found.

The heat decomposition of chlorosulphonic acid yields either traces of sulphuryl chloride if inert substances are present or greater quantities in the presence of certain catalysts according to the associated reaction:

$$2ClSO_3H \rightarrow SO_2Cl + SO_4H_2$$

or by recombination of chlorine and sulphurous anhydride. This is a known fact, and it was observed that the presence of sulphuryl chloride did not constitute an objectionable element in the practical embodiment of the method of this invention and that it reacted favourably as a potential mixture of chlorine and sulphurous anhydride.

It was also observed that catalytic agent such as those mentioned hereinabove could be used in the aforesaid chlorination reactions in liquid phase by the method of this invention without altering the advantages inherent thereto.

Another feature characterizing the present invention is that chlorosulphonic acid utilized in the method thereof is advantageously obtained in quantitative amounts by reacting hydrochloric acid with sulphuric acid produced by catalytic oxidation of the sulphurous gas. Thus, a cycle of oxi-chlorination from hydrochloric acid is achieved which departs completely from hitherto described methods in which the substance to be chlorinated is caused to be acted upon by hydrochloric acid and oxygen (or air) in the presence of catalysts, according to the conventional Deacon method.

The interest of this indirect process wherein the oxidation of sulphurous gas into sulphuric anhydride acts as an intermediate vector in the oxidation of hydrochloric acid into chlorine is that at no moment the substance to be chlorinated is in the presence of an oxidizing medium likely to involve losses by burning as in the case of oxichlorination processes deriving from the Deacon method, in which the formation of carbon dioxide gas resulting from the direct action of oxygen on certain oxidizable molecules can be observed.

The chlorinated organic compounds obtained by the method of this invention have been known for many years and their commercial applications are themselves well known to those conversant with the art. Therefore, it is not deemed necessary to repeat herein their usefulness and practical advantages.

By way of illustration and without limiting the scope of the present invention various ways of preparing dichloroethane and chlorobenzene corresponding to the reaction cycles shown hereinafter will now be described:

(I) Preparation of dichloroethane:

(a) Oxidation of $SO_2$:

$$2SO_2 + O_2 \text{ (air)} \longrightarrow 2SO_3 \longleftarrow$$ 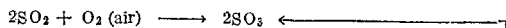

(b) Preparation of chlorosulphonic acid:

$$2SO_3 + 2HCl \longrightarrow 2HSO_3Cl \longleftarrow$$ 

(c) Heat decomposition of chlorosulphonic acid:

$$2HSO_3Cl \longrightarrow \underline{SO_2 + Cl_2} + SO_4H_2$$ 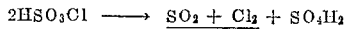

(d) Chlorination of ethylene by addition:

$$CH_2=CH_2 + \underline{SO_2 + Cl_2} \longrightarrow CH_2Cl-CH_2Cl + SO_2$$ 

(e) Reuse of sulphuric acid (for instance):

$$SO_4H_2 + 2NaCl \longrightarrow SO_4Na_2 + 2HCl$$ 

The balance shows a deficiency of $SO_2$ which is compensated by the production of a sulphur burner fed with oxygen or air.

(II) Preparation of chlorobenzene:

(a) Oxidation of $SO_2$:

$$2SO_2 + O_2 \text{ (air)} \longrightarrow 2SO_3 \longleftarrow$$ 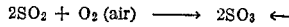

(b) Preparation of chlorosulphonic acid:

$$2SO_3 + 2HCl \longrightarrow 2HSO_3Cl \longleftarrow$$ 

(c) Heat decomposition of chlorosulphonic acid:

$$2HSO_3Cl \longrightarrow \underline{SO_2 + Cl_2} + SO_4H_2 \longleftarrow$$ 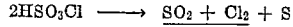

(d) Catalyzed chlorination of benzene by substitution:

$$C_6H_6 + \underline{SO_2 + Cl_2} \longrightarrow C_6H_5Cl + \underline{SO_2 + HCl}$$ 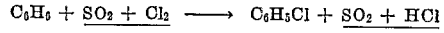

(e) Regeneration of chlorosulphonic acid:

$$SO_2 + HCl + SO_3 \longrightarrow HSO_3Cl + SO_2$$ 

(f) Reuse of sulphuric acid (for example):

$$SO_4H_2 + 2NaCl \longrightarrow SO_4Na_2 + 2HCl$$ 

It is also necessary to compensate the deficiency of $SO_2$ by an addition of $SO_2$.

The oxidation of $SO_2$ into $SO_3$ is carried out in the known manner at a temperature ranging from 400 to 500° C. and preferably at about 450° C. in the presence of a vanadium oxid catalyst.

The production of chlorosulphonic acid from sulphuric anhydride is an exothermic reaction in which the use of catalyst may be dispensed with.

The mixture of chlorine and sulphurous anhydride is obtained by heat decomposition of chlorosulphonic acid in a reactor filled with inert material such as molten silica in coarse-grained condition. With a reactor having a free capacity of 0.5 litre, chlorosulphonic acid input rates ranging from 40 to 500 cc. per hour are used at a decomposition temperature ranging for example from 500° to 800° C., but preferably of the order of 680 to 740° C. The decomposition efficiency exceeds 50%. This heat decomposition process is given by way of illustration only and should not be considered as excluding the use of catalytic agents such as the salts of copper, nickel, cobalt and metals selected from the rare earths group acting in the state of halides.

If desired reaction cycles corresponding to those set forth hereinabove and wherein alkaline or alkaline-earth chlorosulphonates obtained by reacting the corresponding metal chloride either with $SO_3$ or with chlorosulphonic acid may also be used.

In the case of a chlorination by addition, the method will thus comprise the recovery of sulphurous anhydride and the recycling thereof in a reaction leading to the formation of sulphuric anhydride by catalytic oxidation through oxygen, as well as the reaction of this sulphuric anhydride either withan alkaline or alkaline-earth chloride to yield a chlorosulphonate subsequently decomposed by heating into chlorine, sulphurous anhydride and sulphate, or with hydrochloric acid to yield chlorosulphonic acid, which can be subsequently either decomposed by heating into chlorine, sulphurous anhydride and sulphuric acid, with recovery of the sulphuric acid for attacking an alkaline or alkaline-earth chloride with release of hydrochloric acid, or alternately reacted with an alkaline or alkaline-earth chloride to yield a chlorosulphonate and hydrochloric acid, this hydrochloric acid being adapted to be recycled in the reaction leading to the preparation of chlorosulphonic acid.

In the case of a substitution chlorination the method comprises the recovery of the resulting mixture of gaseous sulphuric anhydride and gaseous hydrochloric acid, which consists in reacting this mixture with sulphuric anhydride or sulphuric oleum (fuming sulphuric acid) to produce chlorosulphonic acid from the hydrochloric acid of said mixture at a temperature low enough to separate the chlorosulphonic acid in the liquid state from the gaseous sulphurous anhydride and in separately recycling the gaseous sulphurous anhydride and the liquid chlorosulphonic acid thus separated in the cycles producing respectively sulphuric anhydride and chlorine, which have been described hereinabove.

EXAMPLE 1

Addition of chlorine to ethylene—Preparation of dichloroethane.

Two reactors having dichloroethane in the vessel bottom and containing 0.2% by weight of dissolved ferric chloride are operated in series. The gases, ethylene and mixture of chlorine and sulphurous anhydride from the heat decomposition of chlorosulphonic acid, are measured by means of rotary throughputmeters and mixed before introducing them in a state of fine dispersion into the first reactor. After circulating through the first reactor these gases flow into the second reactor and are eventually analyzed as they emerge therefrom. Preferably, the reactors are heated at a temperature of about 40° C., whereafter the gases are introduced at the rate of 32 litres/hour of the chlorine and sulphurous anhydride mixture and 46 litres/hour of ethylene per kilogram of dichloroethane into the two vessels. As the reaction is of exothermic nature, the reactor heating is discontinued and a temperature of about 40° C. is maintained in the first reactor if necessary, by water circulation. It will be observed that the reaction takes place nearly completely in the first reactor. The ethylene surplus resulting from the molar ratio utilized, i.e., 1.5 mole of ethylene per mole of chlorine, is found again integrally in the effluent gas. After a dissolution time ending when the reaction medium is saturated, the whole of the sulphurous gas is found again at the outlet of the reactors. The chlorine is consumed integrally and only small amounts of hydrochloric acid are found at the outlet. The yield of dichloroethane is about 95% of the initial ethylene ratio, the residue consisting of more chlorinated products separable by distillation.

This yield is practically unchanged if the molar ratio of ethylene to chlorine is 1.1:1.

EXAMPLE 2

Chlorination of benzene

Preparation of chlorobenzene.—The same apparatus as in Example 1 is used and the reactors are loaded with benzene containing 1% by weight of ferric chloride. The reactors are preheated at 40° C. and the chlorine and sulphurous anhydride mixture resulting from the heat decomposition of chlorosulphonic acid is passed therethrough by reason of 52 litres/hour and per kilogram of benzene introduced into the reactors. The reaction is of exotheric character and the reactor temperatures are kept at about 40 to 50° C. by cooling the first reactor if necessary. It will be noted that the reaction takes place nearly completely in the first reactor. The effluent gases are nearly completely free of chlorine and the hydrochloric acid thus obtained is in nearly theoretical amounts. The yield of chlorobenzene is about 90% of the initial chlorine, the residue consisting mainly of dichlorobenzene. By reducing the surplus of initial benzene the production of dichlorobenzene may be increased appreciably.

What I claim is:

1. A method of chlorinating ethylene by addition to produce dichloroethane selectively which comprises carrying out the chlorination reaction by feeding gaseous ethylene and a chlorination agent consisting of a mixture of gaseous chlorine and gaseous sulphurous anhydride, the volume ratio of the two gases in said chlorination agent being in the range between 1:10 and 10:1, into dichloroethane as a liquid solvent medium while said reaction is maintained at a temperature of the order of 40° C.

2. A method as set forth in claim 1, wherein the volume ratio of the gaseous chlorine and the gaseous sulphurous anhydride is about 1:1.

3. A method as set forth in claim 1, wherein the mixture of gaseous chlorine and gaseous sulphurous anhydride is obtained by the thermal decomposition of a member of the group consisting of chlorosulphonic acid and the alkali and alkaline-earth chlorosulphonates.

4. A method as set forth in claim 3 wherein said mixture of gaseous chlorine and gaseous sulphurous anhydride is obtained by said thermal decomposition of chlorosulphonic acid and wherein said method further comprises:

preparing said chlorosulphonic acid by the catalytic oxidation of sulphurous anhydride with atmosphere oxygen to obtain sulphuric anhydride, followed by reaction of said sulphuric anhydride with hydrochloric acid;

recovering sulphuric acid produced together with said mixture of sulphuric anhydride and chlorine during said thermal decomposition of chlorosulphonic reaction;

reacting the recovered sulphuric acid with sodium chloride to yield hydrochloric acid;

recycling the thus produced hydrochloric acid into reaction with sulphuric anhydride to produce chlorosulphonic acid;

separating said sulphurous anhydride from the organic components of the chlorination reaction mixture; and recycling said sulphurous anhydride into said catalytic oxidation reaction in the preparation of chlorosulphonic acid.

5. A method as set forth in claim 1 in which said chlorination of ethylene in said liquid medium is carried out in the presence of an addition chlorination catalyst.

References Cited

UNITED STATES PATENTS

| | | | |
|---|---|---|---|
| 2,174,111 | 9/1939 | Reed | 260—650 XR |
| 2,340,961 | 2/1944 | Hixon et al. | 23—219 XR |
| 2,354,464 | 7/1944 | Laury | 23—139 |
| 2,375,002 | 5/1945 | Iler et al. | 23—219 |
| 2,377,642 | 6/1945 | Mooney et al. | 23—139 |
| 2,378,104 | 6/1945 | Reed | 260—660 XR |
| 2,401,644 | 6/1946 | Iler | 23—219 |

FOREIGN PATENTS 1,463,075  11/1966  France.

OTHER REFERENCES

Moeller: Inorganic Chemistry, John Wiley & Sons Inc., New York, 1952, p. 524.

Mellors: "Modern Inorganic Chemistry," Longmans, 1961, p. 537.

LEON ZITVER, Primary Examiner

H. T. MARS, Assistant Examiner

U.S. Cl. X.R.

23—121; 260—650